Figure 1:
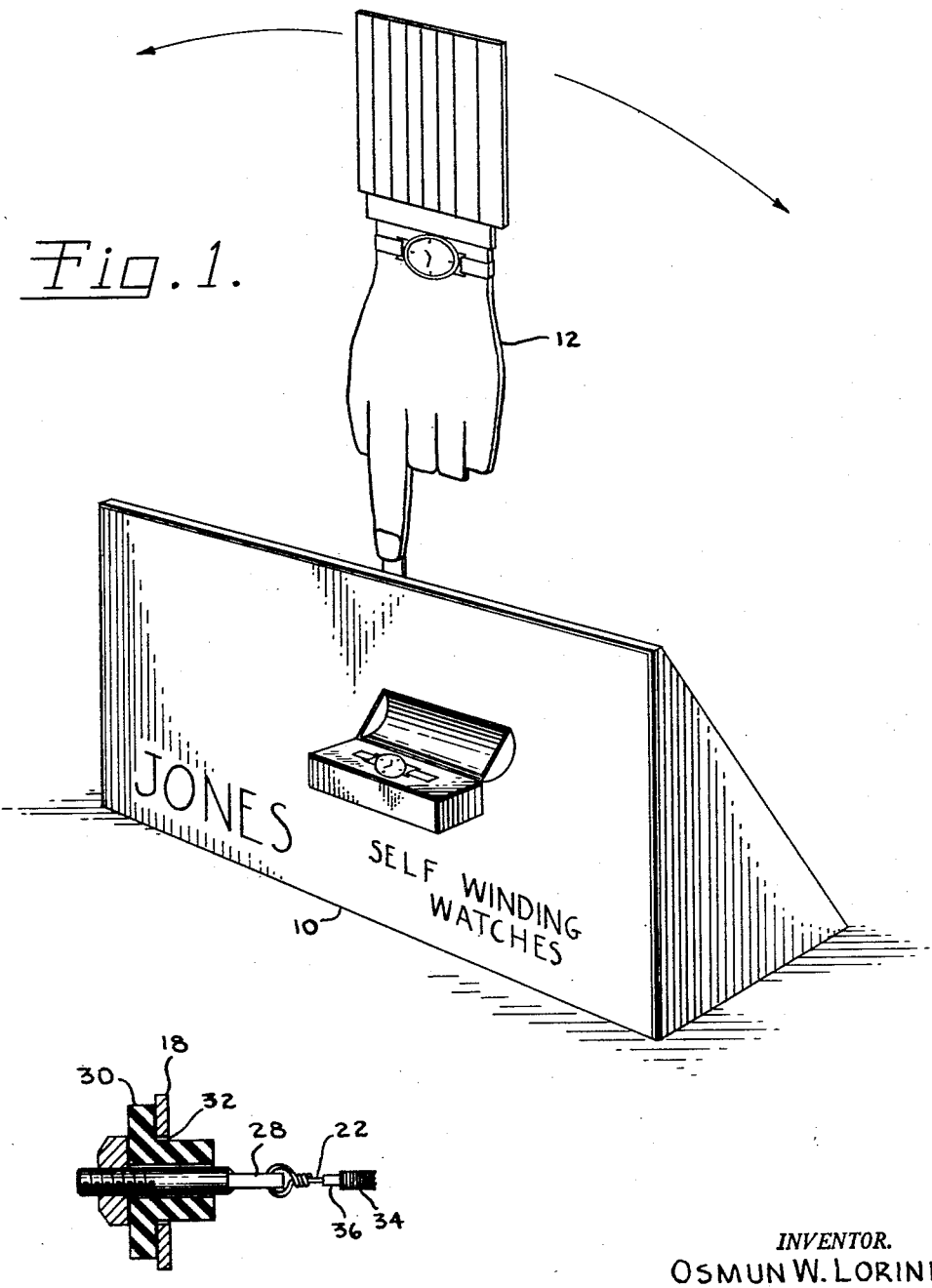

Jan. 8, 1957.  O. W. LORINI  2,777,077
THERMOELECTRIC MOTOR

Filed Oct. 22, 1953.  2 Sheets-Sheet 1

INVENTOR.
OSMUN W. LORINI.
BY James M. Relph
ATTORNEY

Jan. 8, 1957. O. W. LORINI 2,777,077
THERMOELECTRIC MOTOR
Filed Oct. 22, 1953 2 Sheets-Sheet 2

INVENTOR.
OSMUN W. LORINI
BY James M. Relph
ATTORNEY

United States Patent Office 2,777,077
Patented Jan. 8, 1957

2,777,077

THERMOELECTRIC MOTOR

Osmun W. Lorini, Closter, N. J., assignor to Jet-Heet, Inc., Englewood, N. J., a corporation of New York Application October 22, 1953, Serial No. 387,773

3 Claims. (Cl. 310—4)

This invention relates to improvements in thermoelectric motors, and particularly to an improved thermoelectric motor of the type wherein motion is produced by expansion and contraction of a thermally expansible element.

While not limited thereto, the present invention finds particular application in and will be described with special reference to the actuation of a movable element in an advertising display.

As is well known in the field of advertising, a simple display which includes a moving element, regardless of the exact nature thereof, often will attract much more attention than will a completely stationary display, however elaborate. There has, therefore, been an ever-increasing demand for a simple, inexpensive motor that can be produced readily in large quantities, that requires little or no skill in adjusting, that requires substantially no servicing to keep it in working order, and that can be started and stopped easily from a remote point when placed in relatively inaccessible parts of a store window area or the like. It is a general object of the present invention to provide a thermoelectric motor having these and other advantageous characteristics.

It has previously been proposed to provide motive power for advertising display elements and the like by utilizing the expansion and contraction of a thermally expansible element. In the usual case, the arrangement is such that an electric current is passed through the expansible element for heating purposes, and then the current is shut off to allow the element to cool.

One shortcoming of a thermoelectric motor of this type is that the characteristics of the expansible element are dictated as much if not more by electrical requirements than by thermomechanical requirements, yet the actual operation of the device can be no better than its thermomechanical characteristics. The length and cross-section of the conductor, as well as its composition, must be related to the current to be drawn. Usually, for operation on conventional 110–120 volt electrical supplies, such units have required a transformer to reduce the voltage, because the resistance of a conductor of practical length and suitable material is fairly low. Furthermore, as heretofore proposed, the movement obtained from devices of this type has been quite limited, and to obtain greater ranges of movement the prevailing practice has been to use a relatively long expansible element looped back and forth over pulleys or the like; an obviously cumbersome and relatively expensive expedient in view of the fact that, for advertising displays particularly, the motor should be so inexpensive that it can be thrown away with the old display when a new one is to be substituted.

Another disadvantage of such prior art devices has been in the switch means for recurrently opening and closing the electric circuit. Among others, it has been proposed to use bimetallic and mercury switches, both of which are far too expensive to be practical in a device of this kind.

It is, accordingly, among the more specific objects of the present invention to provide an improved thermoelectric motor wherein the characteristics of the motion inducing element are not limited by electrical requirements, wherein no transformer is needed for stepping down the supply voltage, wherein the range of movement provided is substantially greater than in comparable prior art devices, and wherein the circuit control switch is inexpensively incorporated in the assembly as an adjunct to other operational parts.

In accordance with a preferred embodiment of the present invention, the foregoing and other related objects and advantages are attained in a thermoelectric motor wherein a thermally expansible element, such as a length of copper wire, is indirectly heated by electric current flowing through a resistance wire wound around and insulated from the expansible element. The expansible element is linked to a resilient arm in such manner that the arm is slightly strained when the expansible element is in normal contracted condition. When the element expands under heating, the resilience of the arm causes the arm to move in the directing of elongation of the expansible element. Furthermore, due to the resilience and the inertia of the movable arm, the angular movement of the free end of the arm will be considerably greater than that of the end of the expansible element, as in the case of simple oscillatory motion. A switch, one contact of which is carried by the movable arm, automatically opens the heated circuit as the heated element expands. This allows the heated element to cool, whereupon the arm is drawn back as the heated element contracts. As during movement in the other direction, the arm again moves beyond the range of movement of the expansible element by oscillatory action. Upon contraction of the heated element, the accompanying movement of the arm brings the switch contacts into circuit closing relationship, thereby causing the cycle to repeat. As this action continues, the arc through which the end of the arm moves continually lengthens as the momentum of the arm gradually increases, until eventually the free arm end moves through a very wide arc. In accordance with a further feature of the invention, the linkage between the expansible element and the moving arm preferably is so arranged as to disengage partially at the extreme of the contraction-induced movement of the arm. This allows a certain amount of over-travel of the arm, undamped by the expansible element, thereby further increasing the maximum range of movement of the arm.

Figure 2:
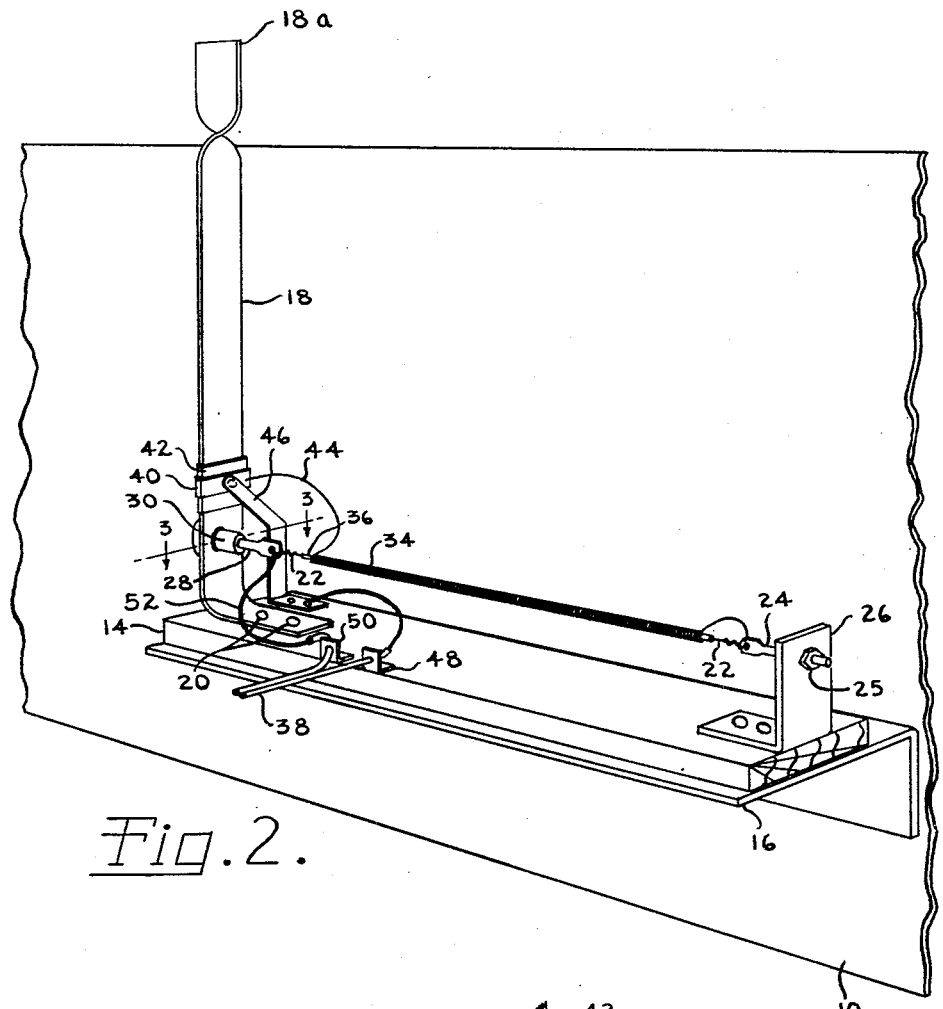
Figures 2A, 4:
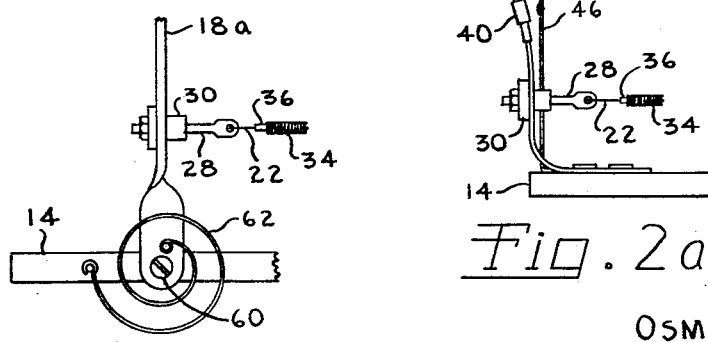

A more complete understanding of the invention, and of further objects and features thereof, can be had by reference to the following description of illustrative embodiments, when considered in connection with the accompanying drawing, wherein:

Figure 1 is a perspective view of an advertising display of the type in which the motion device of the present invention finds particular application, Figure 2 is a perspective view of a motion device embodying the invention, Figure 2a is a side elevation of the switch portion of the motor, showing the switch open, Figure 3 is a fragmentary sectional view, taken in the direction of the arrows 3—3 in Figure 2, showing the linkage between the movable arm and the expansible element, and Figure 4 is a fragmentary view of an alternative embodiment of the invention.

Referring to the drawing, in Figure 1 there is shown an advertising display comprising a cardboard stand 10 exhibiting a wrist watch of the "self-winding" type. Extending above the stand 10 is a cardboard model of a man's hand and wrist, with a wrist watch displayed thereon. The forefinger of the hand is pointing toward the main display. It is intended that the hand and arm 12 be moved back and forth, as indicated by the arrows, both to suggest the type of movement that would wind the watch and to attract attention generally to the display. The motion device for moving the arm back and forth normally will be mounted on the back of the poster, to be concealed as the display is viewed from the front.

Referring to Figure 2 of the drawing, the device for moving the man's arm in the display of Figure 1 comprises, in accordance with the invention, a thermoelectric motor which includes a base member 14, stapled or cemented to a suitable shelf 16 on the back of the stand 10. The base may, for example, comprise a wooden strip approximately 10" long, 1½" wide and ¼" thick.

Anchored at one end to the base 14 is a resilient arm 18 comprising a flat strip of spring steel or the like, on the free end 18a of which will be mounted the element to be moved in the display; in this case, the man's arm. The strip 18 may be of the order of 8" long, ½" wide and .010" thick, and may be anchored to the base 14 by staples or rivets 20. The strip 18 is bent adjacent the point of attachment to extend upwardly from the base substantially at right angles thereto. Alternatively, of course, a straight strip could be suitably fastened to the flat end face of the base member. Near its upper end, the strip may be twisted 90°, if required, so that it will fit properly in a receiving slot (not shown) on the back of the display member 12.

Extending along and spaced slightly above the base is a motion-inducing, thermally expansible element 22, such as a straight piece of copper wire. At one end, the copper wire is linked by an eyeleted adjusting screw or spade bolt 24 to an anchoring element 26 fixed to the base 14. At the other end, the wire 22 is linked to the arm 18 through the medium of a second eyeleted screw 28 (see Figure 3) which extends through a bushing 30 fitting loosely in a hole 32 near the anchored end of the movable arm 18. The copper wire 22 normally will be adjusted by means of the nut 25 at the anchoring element 26 so that the wire will be under tension and will apply bending stress to the portion of the arm 18 between the hole 32 and the base 14. Thus, the wire will hold the arm in a rest position slightly displaced from the position that would otherwise be occupied by the unstressed arm. It is to be noted that the loose fit of the bushing 30 in the hole 32 will permit the arm 18 to move free of the bushing head when the arm swings toward the anchoring element 25.

Surrounding the wire 22 throughout substantially the entire length thereof is an electric heating element. For example, the heating element may comprise Nichrome wire 34 wound around the copper wire 22 and insulated therefrom by a sleeve 36.

The heater is connnected in an electric circuit which includes the usual conductors 38 leading to a plug (not shown) for insertion in a standard electrical outlet, and a switch 40, 46 for opening and closing the heater circuit.

The switch comprises a movable contact in the form of a plate 40 carried by the arm 18 and insulated therefrom by insulating material 42. This contact element 40 is connected by a very light, flexible lead 44 to one end of the heater wire 34. The other switch contact comprises a resilient strip 46 of conductive material which bears against the plate 40 when the arm 18 is at rest. This switch contact 46 is connected at a terminal 48 to one of the supply conductors 38. The other end of the heating element 34 is connected back to the remaining plug lead terminal 50 by any suitable conductor. Conveniently, such conductor may comprise the expansible wire 22, in which case the heating element wire 34 will be connected to the copper wire 22 at the holding screw 24, and the copper wire 22, in turn, will be connected to the terminal 50 by a wire 52 leading from the other holding screw 28 to the terminal 50. With this arrangement, it is preferable to have an insulator between the copper wire 22 and the arm 18 so that the arm will not be electrically "hot." For example, the bushing 30 may be made of insulating material, such as a thermoplastic material.

The contact strip 46 is adjusted to be stressed slightly as it bears against the plate 40 when the arm is at rest. In this condition the switch will complete a circuit for supplying heating current to the heater wire 34.

When the unit is energized, current will flow through the heater wire 34, heating the copper wire 22 and causing it to elongate. This will release the bending stress on the arm 18, allowing the arm 18 to swing to the left due to the resilience of the stressed portion between the hole 32 and the base 14. In so moving, the arm 18 will break the connection between the contacts 40, 46 and open the heating circuit. Figure 2a illustrates the relative positions of the parts at this point in the operating cycle. This will allow the copper core 22 to cool and contract, thereby drawing the arm 18 back through and past the rest position, reengaging the contacts 40, 46. There upon, the heating element again will draw current, reheating the copper wire to repeat the cycle. The resilience of the arm 18, and the inertia of the arm and the display element on the end of the arm, will cause the arm to bend at each extreme of the arm movement, so that the arc (in degrees or radians) through which the display element travels will be substantially greater than the arc through which, say, the arm portion carrying the contact plate 40 moves. In effect, then, the arm will oscillate back and forth, much like a pendulum, substantially at the natural frequency of the combined arm and display element, with the recurring impelling force due to contraction of the wire keeping the arm in oscillation. Simultaneously, the switch contacts 40, 46 will open and close in synchronism with and in response to the motion of the arm, thereby cyclically supplying heating current to the heating element. As noted hereinafter, the pendulum-like action of the arm can be utilized (with the arm extending downwardly) to eliminate the spring restoring force.

As was previously noted, the linkage of the copper wire to the movable element preferably is partially disengageable so that the movement of the arm in the direction of contraction of the copper wire will not be damped by the relatively stiff copper wire. In other words, the arm overtravels in moving to the right, moving out of contact with the bushing head and thereby substantially increasing the range of movement of the arm. While it is, of course, possible to have the copper wire fixed rigidly to the oscillating arm, the releasable linkage arrangement is deemed preferable as it eliminates the damping effect of the relatively stiff copper wire on the retraction stroke and thereby substantially increases the maximum range of movement of the arm.

The construction shown in Figure 2 is preferred for simplicity and economy of parts. The switch contacts 40, 46 are essentially the only parts subject to frictional wear (on the engaging faces), and such wear is negligible. By combining the spring action and the movable arm in a single element, the cost of manufacture and assembly is kept very low, yet without adverse effect on performance characteristics.

While the construction shown in Figure 2 constitutes the preferred embodiment of the invention, there is shown in Figure 4 an alternative construction that embodies important features of the invention, and that may be advantageous in some installations, as where the weight of the movable display item requires greater stiffness of the supporting movable arm.

In the Figure 4 arrangement, the movable element comprises an arm 18a pivotally connected to a base 14 as at 60, and linked to an expansible element 22 with a disengaging linkage as in the Figure 2 construction. In Figure 4, the spring force is provided by a coil spring 62, connected at one end to the base 14 and at the other end to the movable arm 18a. The heating element may be arranged as in the Figure 2 apparatus.

In the Figure 4 system, the tension of the contracted actuator 22 will be adjusted so that there is a slight stress tending to uncoil the spring 62. When current flows through the heating element 34 causing the actuator 22 to elongate, the uncoiling stress on the spring 62 will be released and the spring will move the arm 18 to the left (as viewed in the drawing), followed by a sequence of events substantially the same as those already described in connection with the operational description of the Figure 2 apparatus. In this case, the coiling and uncoiling of the spring supplies the supplementary force derived from the resilience of the arm itself in the Figure 2 apparatus.

By inverting the base 14 so that the arm 18 or 18a extends downwardly, the force of gravity can be substituted for the spring force supplied by the resilience of the arm 18 in the Figure 2 embodiment and by the spring 62 in the Figure 4 embodiment. In such case, the arm will be displaced slightly against the force of gravity by the cool contracted element 22, and will oscillate as the element 22 alternately is heated and cooled, the oscillations being sustained by the recurrent action of the expansible element overcoming the force of gravity.

What is claimed is:

1. In a motion device, a base, a resilient arm attached at one end to said base and extending upwardly from said base and carrying at its opposite end an element of sufficient mass to cause said arm to oscillate through a rest position upon the application of oscillation-inducing forces to said arm, said arm having a hole therein at a point close to the point of attachment of said arm to said base, an anchoring element fixed to said base and spaced from said arm, a thermally expansible element extending from said anchoring element to said arm, a bolt fitting loosely in said hole and having at one end a head engageable with said arm, means connecting said bolt to said expansible element, the resilience of said arm normally urging said arm away from said anchoring element and against the head of said bolt to provide one of said oscillation-inducing forces, thereby normally maintaining said expansible element tautly extended between the bolt and the anchoring element when the expansible element is in unexpanded state to provide another of said oscillation-inducing forces, an electrical heating wire wound around said expansible element, an electric circuit for said heating wire including switch means for opening and closing said circuit in response to oscillatory movement of said arm, the arrangement being such that said switch is closed when said expansible element is in normal unexpanded condition and said circuit is open when said expansible element is in heated expanded condition.

2. In a motion device, a base, a resilient oscillatory member extending upwardly from said base with its upper end free to move back and forth above said base and carrying at said free upper end an element of sufficient mass to cause said member to oscillate upon the application of oscillation-inducing forces to said member, a thermally expansible wire connected at one end to said base and extending along said base and linked at its other end to said member adjacent the basal end of said member, said wire being drawn taut to provide a tensile force constituting one of said oscillation-inducing forces and bending the portion of said member between said base and the point of linkage of said wire to said member and urging said member in the direction in which said wire extends from said member, said tensile force being balanced by the equal and opposite oscillation-inducing force developed by said bending of said member, the link coupling between said member and said wire being disengageable upon movement of said member in the direction in which said wire extends to prevent damping by said wire of the movement of said member in said direction in which said wire extends, and means to heat said wire recurrently in synchronism with oscillation of said member as induced by the relaxation and contraction of said wire accompanying heating and cooling thereof.

3. In a motion device, a base, an arm of spring metal attached at one end to said base and extending from said base and carrying at its opposite end an element of sufficient mass to cause said arm to oscillate through a rest position upon the application of oscillation-inducing forces to said arm, said arm in said rest position being substantially at right angles to said base, said arm having a hole therein adjacent the point of attachment to said base, a bolt fitting loosely in said hole and having at one end a head engageable with said arm, an anchoring element on said base, an elongated, thermally expansible element coupled between said anchoring element and said bolt and tensioned when contracted to deflect said arm to said rest position against the inherent spring restoring force of said arm, said tensioning and said spring force providing said oscillation-inducing forces, an electrical heating element adjacent said expansible element for heating said expansible element, means for conducting heating current to said heating element and including a switch, said switch comprising a first contact element carried by said arm and a second contact element extending from said base and bearing against said first contact element in one portion of the range of oscillatory movement of said arm and spaced from said first contact element throughout the remaining portion of said range of oscillatory movement, said one portion of said range of oscillatory movement including said rest position of said arm.

References Cited in the file of this patent

UNITED STATES PATENTS

| 260,651 | Brush | July 4, 1882 |
|---|---|---|
| 1,527,140 | Jamin | Feb. 17, 1925 |
| 1,576,649 | Gregory | Mar. 16, 1926 |
| 1,804,709 | Shoenberg | May 12, 1931 |